UNITED STATES PATENT OFFICE.

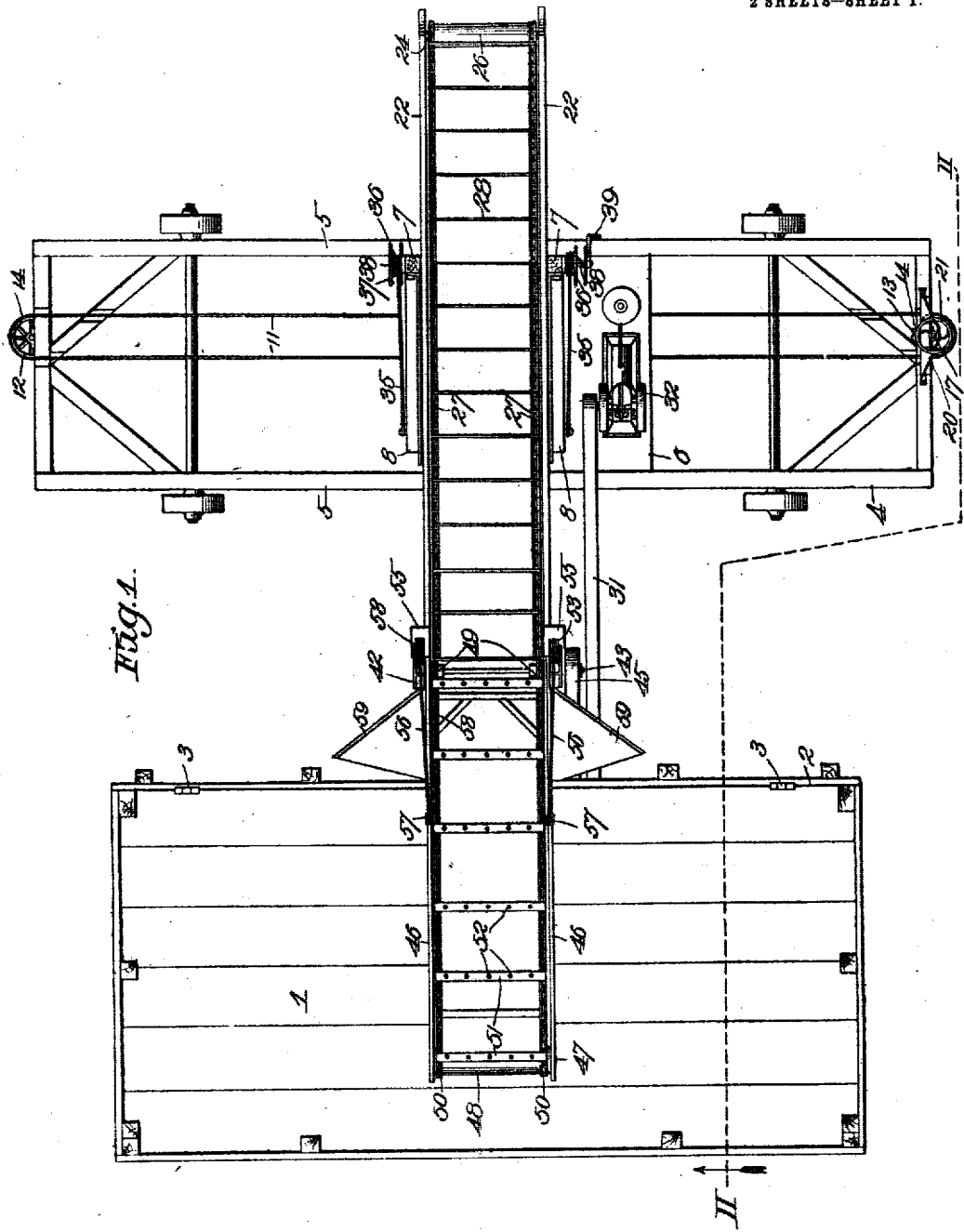

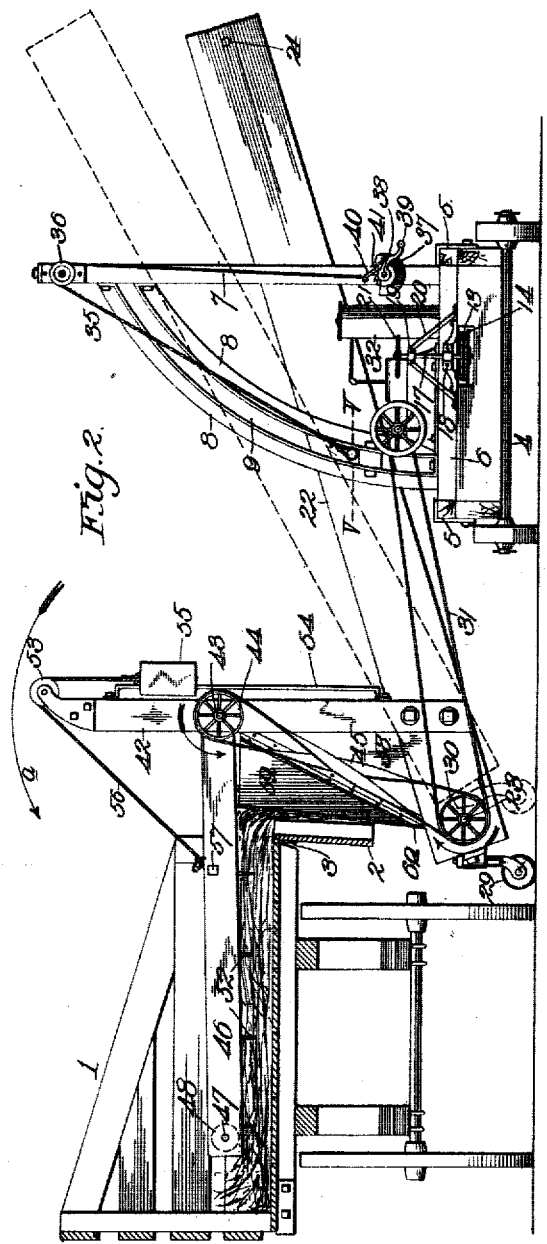

ELMER E. LOGAN, OF LARNED, KANSAS.

GRAIN-HANDLING APPARATUS.

No. 811,938.  Specification of Letters Patent.  Patented Feb. 6, 1906.

Application filed March 3, 1905. Serial No. 248,357.

*To all whom it may concern:*

Be it known that I, ELMER E. LOGAN, a citizen of the United States, residing at Larned, in the county of Pawnee and State of Kansas, have invented certain new and useful Improvements in Grain-Handling Apparatus, of which the following is a specification.

This invention relates to grain-handling apparatus; and my object is to produce an apparatus for automatically unloading grain from a header-box and stacking such grain or feeding it to a threshing-machine.

A further object is to produce an apparatus of this character which will efficiently, reliably, and expeditiously perform its work and materially reduce the cost and labor of harvesting grain.

A still further object is to produce a grain-handling apparatus of the character outlined of simple, strong, durable, and cheap construction.

With the above-named objects in view the invention consists in certain novel and peculiar features of construction and organization, as hereinafter described and claimed, and in order that it may be fully understood reference is to be had to the accompanying drawings, in which—

Figure 1 represents a top plan view of a grain-handling apparatus embodying my invention, the same being operatively arranged for unloading grain from a header-box and stacking it. Fig. 2 is a vertical section taken on the line II II of Fig. 1. Fig. 3 is a view of the receiving end of the endless elevator. Fig. 4 is a detail sectional view showing the means for attaching and guiding the chain on the slide-frame. Fig. 5 is a horizontal section, enlarged, on the line V V of Fig. 2.

In the said drawings, 1 designates the usual or any preferred type of what is known as a "header-box," the same being in the form of a large wagon which is drawn along by the side of the harvester and receives the grain therefrom and is afterward driven to the point where the stack is to be built or where the threshing-machine is placed. This header-box differs from those in ordinary use in that its low side 2 is hinged, as at 3, in order that it may be swung down to approximately the position shown clearly in Fig. 2, or said lower side 2 may be otherwise removably supported in its upright position.

4 designates a wheeled frame adapted to occupy a position between the point where the stack is to be built or the thresher is stationed and the header-box, and said wheeled frame or vehicle is provided with grooved guideways 5, wherein is slidingly mounted the base 6 of a slide-frame, said slide-frame in this instance consisting of uprights 7 and curved braces 8 therefor, said braces being formed with curved slots 9.

Secured to bolt 10, depending from the base of the slide-frame, is a sprocket-chain 11, said chain extending longitudinally of the wheeled frame and engaging the guide-pulley 12, mounted at the rear end of the machine, and the sprocket-wheel 13 at the front end, said wheels being provided with horizontal flanges 14 at their lower margins to prevent the chain slipping therefrom. To assist in holding the chain up to position, the base 6 is provided with a depending bracket 15, carrying a guide-pulley 16, over which the chain passes. The shaft 17 of the sprocket-wheel is journaled in the boxings 18 and 19 of the skeleton standard 20, mounted on the front end of the wheeled frame, and is equipped with a hand-wheel 21 or its equivalent in order that the chain may be operated to move the slide-frame toward one end or the other of the wheeled frame.

Extending transversely above the wheeled frame and through the slide-frame is an adjustable elevator constructed as follows: 22 indicates the sides of a suitable frame connected at their ends by transverse shafts 23 and 24, the shaft 23 preferably having sprocket-wheels 25 near each end and shaft 24 a roller 26. Connecting said sprocket-wheels and roller are sprocket-chains 27, connected in turn by cross-slats 28, the parts enumerated constituting an endless elevator. Said elevator is equipped at its receiving end with a caster 29 and has its shaft 23 equipped with a belt wheel or pulley 30, connected by a belt 31 to a gas-engine 32 or equivalent motor, preferably mounted on the slide-frame, as shown. Secured rigidly to the sides and about midway the length of the elevator are trunnions 33, which project horizontally outward, one through each slot 9, and journaled on said trunnions are antifriction-rollers 34 for travel up and down in said slots. Secured to the outer ends of the trunnions are cables 35, which extend over guide-pulley 36, carried at the top of standards 7, thence downward to drums 37, secured upon a shaft 38, journaled in the slide-frame, the lower ends of the cables being secured to said drums, so that by turning the handle 39 of the shaft in the proper direction the cables can be wound on the drums to raise the delivery end of the elevator, the latter being held automatically at the desired point of adjustment by means of a pawl 40, pivoted on one of the standards 7 and engaging the ratchet-wheel 41, secured to the contiguous drum. (See Fig. 2.) By the proper curvature of slots 9 the vertical adjustment of the delivery end of the elevator is accomplished without any longitudinal movement thereof, so that said elevator at whatever height from the ground it delivers shall always project the same distance beyond the wheeled frame. In practice the elevator will probably project beyond the side of said frame about seven feet, so that it will build a stack about fourteen feet wide and always deliver in the plane of the longitudinal center of the stack, it being understood, of course, that as the delivery end is raised the angular relation of the elevator with respect to the ground varies, its receiving end approaching the wheeled frame as the delivery end rises and receding from said frame as the delivery end descends.

Secured rigidly to the elevator near its receiving end are standards 42, and journaled in said standards is a shaft 43, having a belt-wheel 44, connected by a cross-belt 45 to the pulley 30, so that the rotation of the latter in the direction indicated by the arrow, Fig. 2, shall operate shaft 43 in the opposite direction, as indicated by the proximate arrow in said figure. Pivoted on shaft 43 for movement in a vertical plane is a conveyer constructed as follows: 46 indicates the sides, connected by the shaft 43 and by a shaft 47, the latter being equipped with a roller 48 and the former with sprocket-wheels 49. 50 indicates chains engaging the sprocket-wheels and roller 48, and 51 transverse slats connecting the chains and provided with gathering teeth or fingers 52, said shafts, sprockets, roller, chains, and toothed slats constituting an endless drag which in practice projects into the header-box when the hinged side of the latter is lowered for the purpose of automatically dragging grain out of said box and causing it to fall on the receiving end of the elevator. For the purpose of tending to swing the endless drag upward the standards 42 are equipped at their upper ends with guide-sheaves 53 and below the latter with vertical guide-rods 54, engaged slidingly by weights 55, cables 56 engaging said sheaves, being attached at their opposite ends to said weights and to bolts 57, secured to the drag-frame. By means of these weights a constant lifting power is exerted on the drag-frame, which power has to be overcome by the operator, who stands in the header-box when the apparatus is unloading grain from the latter, and in order to insure the proper delivery of this grain onto the elevator a hopper is provided, the back of the same being formed by the depending side 2 of the header-box where the construction is such that said side depends as shown. The sides of the hopper are formed by the vertical boards 58, secured to standards 42, and the outwardly and downwardly converging wings 59 united rigidly to boards 58 by angle-irons 60.

When the grain is to be stacked, the slide-frame is disposed, by preference, at one end of the wheeled frame, the hand-wheel 21 being manipulated to accomplish this purpose, as will be readily understood. The drums are manipulated to lower the elevator to about the position shown in full lines, and then the drag-frame is swung in the direction indicated by the arrow $a$ to the position illustrated in Fig. 2, where it will be noticed it is projected into the header-box, which it is supposed at this time is filled with grain, and is disposed substantially parallel with the wheeled frame and opposite the same, so that when the elevator is near one end of the wheeled frame the "drag" shall be contiguous to the corresponding end of the header-box. An attendant stands in the header-box and presses the drag-frame down upon the grain as a second attendant or engineer starts starts the gas-engine or other motor in operation and simultaneously starts the drag-frame and elevator in operation, the former dragging the grain out of the header-box and disposing practically all of it, because of the hopper described, upon the receiving end of the elevator. The elevator discharges it at its opposite end upon the ground, if a stack is to be formed, or into the feeder of a threshing-machine (not shown) if the grain is to be immediately threshed. As the operation of the machine continues the operator in the header-box gradually depresses the drag-frame, so that it shall descend as the volume of grain diminishes in depth or thickness. As the stack attains approximately the height of the delivery end of the elevator and the ends of the header-box where the drag is lowered is practically emptied the hand-wheel is turned to move the slide-frame about its own width, or the wheeled frame may be moved approximately said distance, (the former adjustment is preferred,) so that the drag will be disposed over an unemptied part of the header-box and the delivery end of the elevator will be disposed over the ground at a point to one side of the pile of grain already stacked, these adjustments or others by which the same object is accomplished being repeated at intervals until a stack has been built which corresponds in length with the wheeled frame and in height with the distance between the ground and the delivery end of the elevator, it being understood, of course, that in this operation the contents of several header-boxes may have been unloaded. After the stack has grown to about the proportions stated the crank-handle 39 is manipulated to raise the delivery end of the elevator for the purpose of depositing more grain upon the top of the stack thus formed and eventually building the stack to the height required. The elevation of such delivery end of the elevator of course draws its opposite end nearer to the wheeled frame and necessitates the disposition of the next series of header-boxes somewhat nearer the wheeled frame, as it is always necessary that the receiving end of the elevator shall underlie the open side of the header-box, as will be readily understood. When the header-box is completely emptied, the drag-frame is swung upward out of the way, so that the header-box can be driven back to the field for a second charge of grain, and immediately a second header-box assumes the vacated position and the drag is lowered therein. When the wheeled frame is moving from one field to another, the elevator is raised, through the instrumentality of the drums, entirely off the ground, by preference, and the drag is swung back in the opposite direction to that indicated by the arrow a, Fig. 2, until its free end rests upon the elevator and within the slide-frame, as will be readily understood.

The apparatus described may, as hereinbefore suggested, be used in an obvious manner for discharging the grain directly from the header-box into the threshing-machine or into a self-feeder attached thereto, and thus act as a substitute for the pitchers—i. e., the men ordinarily employed for feeding the threshing-machine.

From the above description it will be apparent that I have produced an apparatus which will effectually and reliably perform the hardest work in connection with harvesting and stacking grain and possesses the advantages enumerated.

Having thus described the invention, what I claim as new, and desire to secure by Letters Patent, is—

1. The combination of a portable supporting-frame, a carrying-frame mounted on said supporting-frame and adjustable longitudinally of the same, an elevator mounted on the said carrying-frame with its ends projecting beyond the sides of the supporting-frame, and means for adjusting the elevator vertically upon the carrying-frame.

2. The combination of a carrying-frame, a vertically-adjustable elevator carried thereby, standards at one end of the elevator, a drag pivotally supported upon said standards, and means for simultaneously operating the drag and the elevator.

3. In an apparatus of the character described, the combination of a movable supporting-frame having curved slots which terminate at their opposite ends at opposite sides of the longitudinal center of said frame, and an elevator extending through said supporting-frame and having trunnions engaging the slots thereof, and provided at its receiving end with a caster to rest upon the ground.

4. In an apparatus of the character described, the combination of a movable supporting-frame having curved slots which terminate at their opposite ends at opposite sides of the longitudinal center of said frame, an elevator extending through said supporting-frame and having trunnions engaging the slots thereof, and provided at its receiving end with a caster to rest upon the ground, and means for moving said trunnions upward or downward in said slots.

5. In an apparatus of the character described, the combination of a movable supporting-frame having curved slots which terminate at their opposite ends at opposite sides of the longitudinal center of said frame, an elevator extending through said supporting-frame and having trunnions engaging the slots thereof, and provided at its receiving end with a caster to rest upon the ground, means for moving said trunnions upward or downward in said slots, and means for securing said trunnions at the desired point of adjustment in said slots.

6. In an apparatus of the character set forth, the combination of a head-box having a side arranged to depend therefrom, an elevator having vertically-arranged converging wings which form a hopper with the pendent side of the header-box, and a drag arranged to project into the header-box and feed the material therein to the hopper.

7. In an apparatus of the character described, the combination of a movable supporting-frame, an elevator supported from and projecting beyond the sides of said frame and adjustable longitudinally thereof, a header-box, an endless drag pivotally supported from the elevator, and means for yieldingly swinging the drag upward or downward when projected into the header-box.

8. In an apparatus of the character set forth, the combination of a supporting-frame having curved slots in its sides, an elevator extending through said frame and provided on its sides with trunnions engaging said curved slots, and means for moving the trunnions along the slots and securing them at any desired point.

In testimony whereof I affix my signature in the presence of two witnesses.

ELMER E. LOGAN.

Witnesses:
J. J. STOCKMAN,
L. E. ROFF.